Figure 2:
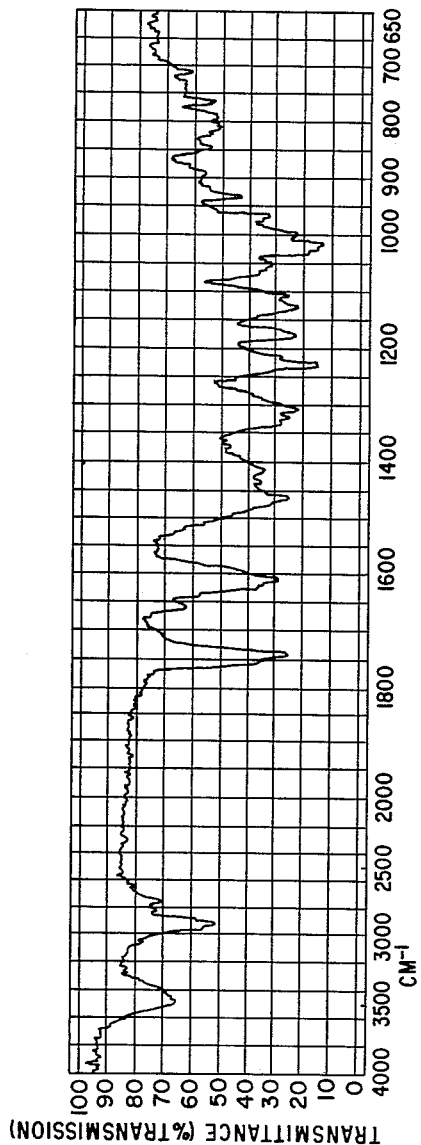
Figure 3:
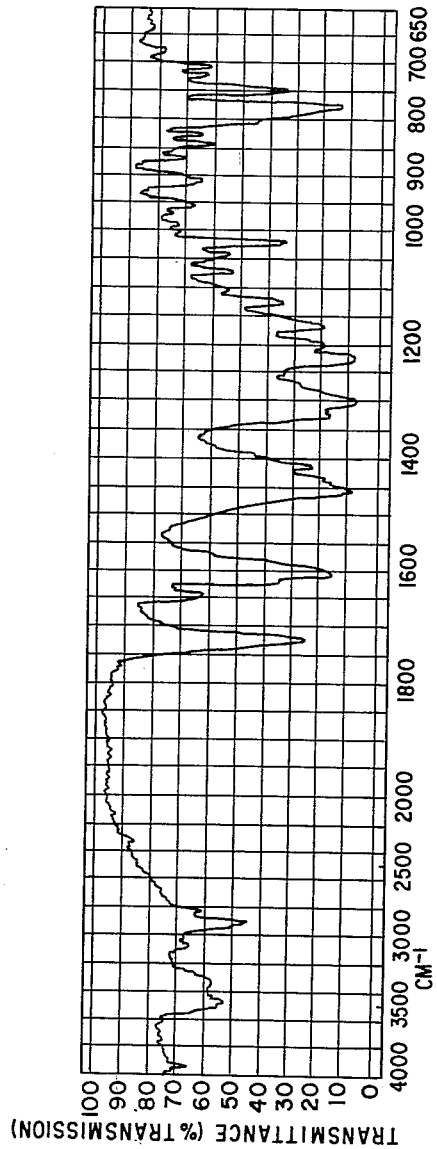

FIG. I

*INVENTOR*
ERNST GAEUMANN
VLADIMIR PRELOG
ALBERT WETTSTEIN

INVENTOR
ERNEST GAEUMANN
VLADIMIR PRELOG
ALBERT WETTSTEIN

UNITED STATES PATENT OFFICE 3,039,924
Patented June 19, 1962

3,039,924
CINERUBINS A AND B, THEIR AGLYCONE CINERUBINONE AND THEIR PRODUCTION
Ernst Gaeumann and Vladimir Prelog, Zurich, and Albert Wettstein, Basel, Switzerland, assignors to Ciba Corporation, Summit, N.J.
Filed Mar. 13, 1957, Ser. No. 645,873
Claims priority, application Switzerland Mar. 23, 1956
18 Claims. (Cl. 167—65)

The present invention relates to two new antibiotics, to be hereinafter termed "cinerubin A" and "cinerubin B," their derivatives and salts, and mixtures thereof, and also pharmaceutical preparations which contain these compounds, and processes for the manufacture of these substances and substance mixtures.

The cinerubins are produced in the culture of a new variety of *Streptomyces cinereoruber* Corbaz et al. which is not identical with any of the species mentioned in Bergey's "Manual of Determinative Bacteriology," 6th edition, or in "Actinomycetes and Their Antibiotics," by Waksman and Lechevalier, 1953, and is hereinafter described as *Streptomyces cinereoruber* Corbaz et al. var. *fructofermentans*. It was isolated from a soil sample collected in the Zurich Zoo and a sample of it is preserved in the Federal Institute of Technology, Institut für spezielle Botanic, Zurich, under the designation A–6143. A sample of it has also been sent to the Culture Collection, Unit Fermentation Section, Peoria, Ill., and has been accorded the number NRRL 2588.

*Streptomyces cinereoruber* var. *fructofermentans* forms a sparce aerial-mycelium, which is originally white, and then becomes white-grey and finally ash-grey colored. It has conidia chains, a typical feature of the genus Streptomyces. The spores are smooth. The substrate mycelium is red and forms a soluble pigment. The growth is relatively little dependent upon temperature, the fungus develops well both at 18° C. and also at 40° C., the optimum lying however between 25 and 32° C.

For further characterization there is described below the growth of *Streptomyces cinereoruber* var. *fructofermentans* on various nutrient media. The nutrient media 1–7 and 11 were prepared according to W. Lindenbein, Arch. Mikrobiol. 17, 361 (1952).

Synthetic agar: Growth thin, web-like, colourless after 3 days, later pink; air mycelium dusty, after 8 days milk white or pale carmine, after 14 days ash grey; a pink-red soluble pigment is formed after 4 days.

Synthetic solution: Flocks white-grey to pink; pellicle with sparse white-grey air mycelium; pigment pale carmine.

Glucose agar: Punctated growth, colourless or locally coral red after 3 days, flesh red after 8 days; aerial mycelium sparse, white-grey after 8 days, ash grey after 14 days; substrate flesh red coloured after 8 days.

Glucose-asparagine-agar: Growth as on glucose-agar; air mycelium dusty, chalk white after 4 days, later white-grey; pale carmine red soluble pigment.

Calcium malate-agar: As glucose-asparagine-agar.

Gelatine puncture 18° C.: Surface growth white-yellow to light yellow-red; aerial mycelium sparse, white-grey; soluble pigment intense chestnut brown to reddish brown; liquefaction very slow, commencing after 34 days, 0.4 cm. after 42 days.

Starch plate: Growith punctated, colourless; air mycelium dusty as with flour, white-grey; traces of starch hydrolysis after 4 days.

Nutrient agar: Sparse growth, light yellow; no aerial mycelium; pigment weak, reddish brown.

Potatoes: Lichen-like growth, copper red after 4 days, brownish to pitch black after 8 days, no aerial mycelium; substrate blue-black coloured.

Carrots: Lichen-like growth, grey-blue and pale carmine; aerial mycelium after 8 days velvety, white-grey to ash grey; pigment blue-black.

Litmus milk: Ring growth, pellicle light brown; aerial mycelium sparse white-grey; peptonization after 7 days; no coagulation.

*Streptomyces cinereoruber* var. *fructofermentans*, when examined by the method of T. G. Pridham and D. Gottlieb, J. Bacteriology 56, 107 (1948), with the application of various carbon sources, grows as follows:

| | | | |
|---|---|---|---|
| L-Xylose | + | Inulin | (−) |
| L-Arabinose | + | D-Mannitol | + |
| L-Rhamnose | (+) | D-Sorbitol | + |
| D-Fructose | + | Dulcitol | (−) |
| D-Galactose | + | Mesoinositol | (−) |
| Saccharose | (+) | Salicin | + |
| Maltose | + | Sodium acetate | (−) |
| Lactose | + | Sodium citrate | (−) |
| Raffinose | − | Sodium succinate | (−) |

The above indications have the following meaning: +, good growth, definite use of the carbon source concerned; (+), weak growth, use of the carbon source concerned questionable; (−), very weak growth, use of the carbon source concerned improbable; −, no growth, no use of the carbon source concerned.

*Streptomyces cinereoruber* var. *fructofermentans* is in good morphological agreement with *Streptomyces cinereoruber* (R. Corbaz, L. Ettlinger, W. Keller-Schierlein and H. Zahner, Arch. Mikrob., being printed), but is distinguished biologically from this species by its capacity for utilising different carbon sources, e.g. fructose.

*Streptomyces cinereoruber* var. *fructofermentans* also shows certain similarities with *S. purpurascens* Lindenbein, which latter however forms thorn-like spores and has an entirely divergent carbon source spectrum. The latter is also true in the case of *S. bobiliae* (Waksman et Curtis) Waksman et Henrici. Thus *Streptomyces cinereoruber* var. *fructofermentans* does not use raffinose as a carbon source in contradistinction to *S. purpurascens* Lindenbein and *S. bobiliae* (Waksman et Curtis) Waksman et Henrici.

The present invention, as regards the production of the antibiotics cinerubin A and cinerubin B or mixtures thereof, is not limited to the use of *Streptomyces cinereoruber* var. *fructofermentans* or other varieties corresponding to this description, but also comprises the use of variants of these organisms, as produced, for example, by strain selection or mutation, especially under the influence of ultra-violet or X-rays or of nitrogen mustard oils.

For the production of the cinerubins a streptomycetes strain possessing the properties of *Streptomyces cinereoruber* var. *fructofermentans* is aerobically cultured, for example in an aqueous nutrient solution containing inorganic salts, nitrogeneous compounds and if desired carbohydrates, until the solution exhibits an appreciable antibacterial effect and cinerubin A and/or cinerubin B or a mixture thereof is then isolated from the culture filtrate.

The nutrient solution contains as inorganic salts for example chlorides, nitrates, carbonates or sulfates of the alkali metals, alkaline earth metals, magnesium, iron, zinc or manganese. As nitrogenous compounds and the carbohydrates and growth promoting substances that may be added, there may be mentioned for example: amino acids and mixtures thereof, peptides and proteins and also their hydrolysates, such as peptone or tryptone, meat extracts, water soluble fractions of cereal grains, such as maize and wheat, or of distillation residues from alcohol manufacture, from yeast, beans, especially of the soya plant, of seeds, especially of the cotton plant, and also glucose, saccharose, lactose, starch and so on.

The culture takes place aerobically, that is to say for example in still surface culture or preferably submerged with shaking or stirring with air or oxygen in shaking vessels or in the known fermenters. A temperature between 20 and 40° C. is suitable for the purpose. The nutrient solution exhibits an appreciable antibacterial effect in general after 1½–5 days.

Depending on the nature of the nutrient solution there is obtained a mixture of cinerubin A and B or mainly cinerubin A or mainly cinerubin B. It is possible for example to cultivate *Streptomyces cinereoruber* var. *fructofermentans* in nutrient solutions containing, per liter of water, the following substances.

Nutrient solution No. 12/41: glycerine 20 g.; soya flour 10 g.; sodium chloride 5 g.; calcium carbonate 10 g. and sodium nitrate 1 g.

Nutrient solution No. 22: Mannite 20 g.; distiller's solubles 20 g.; sodium chloride 3 g.; and sodium nitrate 1 g.

Nutrient solution No. 19: Mannite 20 g.; and soya flour 20 g.

When nutrient solution No. 19 is used, chiefly cinerubin A is formed, and when nutrient solution No. 12/41 is used, mainly cinerubin B is obtained. With nutrient solution No. 22 a mixture of cinerubin A and B is produced.

For isolation of the cinerubins the following process can, for example, be used: The mycelium is separated by centrifugation or filtration from the culture filtrate, after which a major quantity of the antibiotics are found in the culture filtrate. However, noteworthy quantities of the antibiotics remain adsorbed on the mycelium. It is therefore advantageous to wash the latter well. For this purpose there are especially suitable organic solvents which are at least partially water soluble, such as alcohols, for example methanol, ethanol and butanols, or ketones, for example acetone and methyl ethyl ketone, or organic or inorganic acids, such as acetic acid, hydrochloric acid or sulfuric acid. These mycelium extracts are added to the culture filtrate either directly or after concentration under vacuum. The mixture is advantageously extracted at a pH between 7 and 9.5 with an organic solvent that is immiscible with water, such as esters of lower fatty acids, for example ethyl acetate or amyl acetate, hydrocarbons, for example benzene, chlorinated hydrocarbons, for example ethylene chloride, methylene chloride or chloroform, ketones, for example methyl propyl ketone, methyl amyl ketone or diisobutyl ketone, alcohols such as butyl alcohol or amyl alcohols, ethers, for example ethyl ether, diisopropyl ether, dibutyl ethers or glycol ethers and the like. Instead of a solvent extraction of the cultures, or in combination therewith as a further purification operation, the antibiotics can also be isolated by adsorption, for example on active charcoal or on activated earths, such as fuller's earth, with subsequent extraction of the adsorbate, for example with an organic solvent at least partially soluble in water, such as acetone, butanol or methyl ethyl ketone.

The cultures can also be extracted directly in the described manner without previous separation of the mycelium.

A further enrichening can be attained by repeatedly extracting the organic extracts containing the antibiotics by means of an acid aqueous solution having a pH between 1 and 5, whereby the majority of the antibiotic activity is transferred to the aqueous phase. A smaller amount of activity remains in the organic phase. The combined acid aqueous solutions are then adjusted to pH between 7 and 9.5 and extracted again in the previously described manner with an organic solvent that is immiscible with water. This procedure can be repeated several times. As acid aqueous solutions are suitable dilute acids, such as acetic acid, hydrochloric acid or sulfuric acid, or buffer solutions, such as citrate or phosphate buffer.

A good process of purification or in case both antibiotics are present, separation of the new antibiotics is constituted by distribution between an acid or an alcoholic aqueous solution and a solvent immiscible with water. Advantageously the distribution takes place by the counter-current method in a suitable apparatus, e.g. that of Craig. Chromatography is also very suitable as a means of purification or, if necessary, of separation. The production of the pure antibiotics in crystalline form is carried out, for example, from organic solvents, such as acetone, methanol, ethanol, chloroform, acetone-methanol mixtures, acetone-ether mixtures, acetone-petroleum ether mixtures or benzene-methanol mixtures. For recrystallisation, the same solvents can be used or also aqueous-organic solutions such as dilute alcohols, dilute acetone and so on.

The antibiotic cinerubin A crystallizes in plates containing large amounts of solvent, which on drying in the air or under vacuum disintegrate to a dark red powder. M.P. 155–157° C. The elemental analysis yields the following values: $C=61.12\%$, $H=7.03\%$, $N=1.91\%$, $OCH_3=4.08\%$. Its ultra-violet absorption spectrum shows bands at the following wave lengths: 234 m$\mu$ (log $E=2.28$), 258 m$\mu$ (log $E=2.36$), 292 m$\mu$ (log $E=1.92$), 475 m$\mu$ (log $E=2.05$), 495 m$\mu$ (log $E=2.11$) and 530 m$\mu$ (log $E=1.94$). In the infra-red spectrum a drawing of which is accompanying the application, bands are visible at the following wave lengths, among others: 2.9$\mu$, 3.4$\mu$, 3.5$\mu$, 5.77$\mu$, 6.06$\mu$, 6.21$\mu$, 6.81$\mu$, 7.02$\mu$, 7.06$\mu$, 7.21$\mu$, 7.55$\mu$, 7.68$\mu$, 7.88$\mu$, 8.14$\mu$, 8.56$\mu$, 8.88$\mu$, 9.05$\mu$, 9.56$\mu$, 9.84$\mu$, 10.37$\mu$, 10.78$\mu$, 11.19$\mu$, 11.31$\mu$, 11.79$\mu$, 12.32$\mu$, 12.71$\mu$ (band with triple peaks), 13.10$\mu$, 13.49$\mu$, 13.75$\mu$, and 14.21$\mu$.

On hydrolysis with dilute mineral acids, the antibiotic cinerubin A decomposes into two reducing sugar components and into a neutral antibiotically active aglycone, cinerubinone. This forms bright red crystals of M.P. 217–220° C. Elementary analysis gives the following values: $C=63.70\%$, $H=5.38\%$, $(C)CH_3=3.42\%$, $OCH_3=7.27\%$ and active hydrogen$=1.26\%$. In the ultra-violet spectrum bands are visible at the following wave lengths: 234 m$\mu$ (log $E=3.01$), 258 m$\mu$ (log $E=2.68$), 294 m$\mu$ (log $E=2.25$), 470 m$\mu$ (log $E=2.30$), 495 m$\mu$ (log $E=2.34$), 515 m$\mu$ (log $E=2.28$) and 530 m$\mu$ (log $E=2.20$).

Cinerubin B forms brilliant orange-colored crystals melting at 180–181° C. The elemental analysis gives the following values: $C=59.76\%$, $H=6.50\%$, $O=30.44\%$, $N=1.78\%$, $OCH_3=4.54\%$, $C\text{---}CH_3=6.38\%$. The U.V. spectrum shows bands at the following wavelengths: 235 m$\mu$ $$(\log E_{1\,cm.}^{1\%}=2.77)$$

258 m$\mu$ (log $E=2.46$), 291 m$\mu$ (log $E=2.03$), 297 m$\mu$ (inflexion), 394 m$\mu$ (inflexion), 415 m$\mu$ (inflexion), 471 m$\mu$ (inflexion), 488 m$\mu$ (log $E=2.24$), 497 m$\mu$ (log $E=2.27$), 519 m$\mu$ (log $E=2.16$) and 533 m$\mu$ (log $E=2.10$). In the infra red spectrum a drawing of which is accompanying the application, bands are visible at the following wave-lengths: 2.83$\mu$, 3.38$\mu$, 3.58$\mu$, 5.71$\mu$, 6.16$\mu$, 6.78$\mu$, 7.02$\mu$, 7.47$\mu$, 7.60$\mu$, 8.06$\mu$, 8.48$\mu$, 8.75$\mu$, 9.41$\mu$, 9.72$\mu$, 9.90$\mu$, 10.18$\mu$, 10.62$\mu$, 11.62$\mu$, 12.15$\mu$, 12.43$\mu$ and 12.85$\mu$.

Upon hydrolysis of cinerubin B with dilute mineral acid the same aglycone cinerubinone is formed as is formed in the hydrolysis of cinerubin A.

The cinerubins show a certain similarity with rhodomycin A and B (H. Brockmann and co-workers, Chem. Berichte 88, 1792/1955, and earlier papers referred to therein), but they have a different behaviour in paper chromatography. Thus, in the system formamide-benzene (Zaffaroni) cinerubin A has an $Rf$ value of 0.85, cinerubin B of 1.00 and rhodomycin (mixture) of 0.3. Moreover the aglycone cinerubinone obtained from cinerubin A and B differs from $\epsilon$-rhodomycinone, which melts at ca. 170° with decomposition in analytical composition and primarily in its infra-red absorption spectrum. Furthermore, cinerubinone has in the above system an Rf value of 0.8, β-rhodomycinone of 0.3.

Cinerubin A and B are easily soluble in chloroform, ethyl acetate, benzene and dilute acids, less soluble in ether and alcohols, such as ethanol, and practically insoluble in water and petrol-ether; cinerubinone shows some degree of solubility in chloroform, ethyl acetate and acetone.

The salts of cinerubin A and cinerubin B are derived from the known inorganic and organic acids, for example from hydrochloric acid, the sulphuric acids, the acetic, propionic, valeric, palmitic or oleic acid, the succinic acid, citric acid, mandelic acid, glutamic acid or phantothenic acid. They constitute neutral or acid salts. Their production takes place by the action of the corresponding acids on the free base or by double decomposition of salts, for example of cinerubin sulphate with calcium pantothenate.

The antibiotics cinerubin A and B possess an antibiotic activity with respect to various test organisms. If there is used as test method in vitro dilution series (tenth powers) in glucose bouillon, incubated for 24 hours at 37° C., the following still inhibiting concentrations are given:

| Test organisms | Inhibiting concentration, mg./cc. | |
| --- | --- | --- |
| | cinerubin A | cinerubin B |
| Micrococcus pyogenes, var. aureus | 0.1 | 10 |
| Micrococcus pyogenes, var. aureus Penicillin-resistant | 1 | 10 |
| Streptococcus pyogenes | 0.01 | |
| Streptococcus viridans | 0.01 | 0.01 |
| Streptococcus faecalis | 1 | 10 |
| Corynebacterium diphtheriae | 0.001 | 0.1 |
| Bacillus megatherium | 0.01 | 1 |
| Candida vulgaria | 0.1 | 1 |
| Endomyces albicans | 0.01 | 1 |
| Mycobacterium tuberculosis [1] | 1 | 10 |
| Entamoeba histolytica [2] | <33 | <100 |

[1] Cultivated in Kirchner's synthetic medium with 0.5% bovine albumen; growth determined after 2 weeks.
[2] Culture in bacto-entameba-medium (Difco, England); amoebicidal activity determined after 24 hours.

The development of influenza virus on isolated membranes of the chicken chorioallantois of 14 day old hatching eggs is still inhibited by cinerubin A or B and cinerubinone in a concentration of less than 1 μg./cc., while the chorioallantois tissue is not toxically injured even by 100 μg./cc.

Moreover, the cinerubins have a strong inhibiting effect on tumors in test animals. The growth of the mouse tumor adeno carcinoma EO 771, for example, is substantially checked by them.

The present invention comprises in addition to the manufacturing process for the crystalline antibiotics cinerubins A and B and for their neutral and acid salts, also the specified compounds themselves, especially the cinerubin sulphates, the cinerubin hydrochlorides, acetates and pantothenates, and also the conversion products obtained by hydrogenation or oxidation together with the splitting products, as are obtained for example in the hydrolysis of cinerubin A and B.

The antibiotics cinerubin A and B their salts and derivatives, the above specified conversion and splitting products or corresponding mixtures can be used as medicaments, for example in the form of pharmaceutical preparations. These contain the specified compounds in admixture with a pharmaceutical organic or inorganic carrier material suitable for enteral, parenteral or local administration. Such carrier substances are concerned that do not react with the new compounds, for example gelatine, lactose, starch, magnesium stearate, talc, vegetable oils, benzyl alcohols, gums, polyalkylene, glycols, petroleum jelly, cholesterol or other known medicament carriers. The pharmaceutical preparations can exist, for example, in the form of tablets, dragees, powder, salves, creams, suppositories or in liquid form as solutions, suspensions or emulsions. If desired they are sterilized and/or contain auxiliary substances such as preserving, stabilizing, wetting or emulsifying agents. They can also contain other therapeutically valuable substances.

The following examples illustrate the invention:

Example 1

A nutrient solution is prepared of the following composition: 20 grams of soya flour, 20 grams of mannitol and 1 liter of tap water and is adjusted to pH 7.8 with dilute sodium hydroxide. This solution, or a multiple thereof, is introduced into 500 cc. conical flasks (each containing 100 cc. of nutrient solution), or into 500 liter fermenters (each containing 300 liters of nutrient solution), in each case sterilisation being carried out for 20–30 minutes with steam up to 1 atmosphere gauge pressure. Inoculation is then carried out with up to 10% of a partially sporulating, vegetative culture of *Streptomyces cinereoruber* var. *fructofermentans* grown on the above medium and incubation effected at 27° C. with good shaking or stirring and in the fermenters with aeration (with about 1 volume of sterile air per volume of nutrient solution per minute). After 70–120 hours' growth, the cultures are filtered with the addition of a filter aid, according to the volume, through a suction filter or through a filter press or a rotating filter and in this manner the antibiotically active aqueous solution containing mainly cinerubin A freed from mycelium and other solid constituents.

Example 2

By using instead of the medium specified in Example 1, the nutrient solutions described below under (a), (b), (c), (d) or (e), there are obtained after analogous sterilization, inoculation with *Streptomyces cinereoruber* var. *fructofermentans*, incubation at 27° C. and filtration, aqueous antibiotically active solutions. Nutrient solutions (a), (b), (c) and (e) give a mixture of cinerubin A and B, while with nutrient solution (d) principally cinerubin B is obtained.

(a) 10 grams of crude glucose, 5 grams of peptone, 3 grams of meat extract (Oxo Lab Lenco), 5 grams of sodium chloride, 10 grams of calcium carbonate and 1 liter of tap water; pH before sterilization 7.5.

(b) 10 grams of crude glucose, 10 grams of distiller's solubles, 1 gram of sodium nitrate, 5 grams of sodium chloride, 10 grams of calcium carbonate and 1 liter of tap water; pH before sterilization 7.5.

(c) 10 grams of crude glucose, 20 of corn steep liquor; 2 grams of secondary potassium hydrophosphate and 1 liter of tap water; pH before sterilization 7.5.

(d) 20 grams of glycerine, 10 grams of soya flour, 5 grams of sodium chloride, 10 grams of calcium carbonate, 1 gram of sodium nitrate, and 1 liter of tap water; pH before sterilization, 7.5.

(e) 20 grams of mannite, 20 grams of distiller's solubles, 3 grams of sodium chloride, 1 gram of sodium nitrate, and 1 liter of tap water; pH before sterilization, 7.8.

Example 3

The filter residue from a 150 litre batch obtained according to Example 1 or 2 is stirred with 25 liters of acetone and filtration again carried out. This procedure is twice repeated, whereupon the combined acetone solutions containing antibiotic are concentrated under vacuum to 5 liters and combined with the culture filtrate. The resulting solution is now extracted at pH 8.5 with 70 liters of ethyl acetate in a Westphalia extractor, whereby the total antibacterial activity passes over into the organic phase. The extract is now washed with water, evaporated under vacuum to 5 liters and then extracted by shaking several times with 0.5 N-acetic acid. The ethyl acetate solution now exhibits a slight antibacterial activity while the majority of the activity is found in the acetic acid solutions. These orange red coloured solutions are combined, brought to pH 8.5 with 2N-sodium carbonate solution, whereby the colour changes to violet, and again extracted with ethyl acetate. The ethyl acetate extract is again extracted with 0.5 N-acetic acid, whereupon the latter, as above described, is rendered alkaline and extracted. Finally the ethyl acetate solution is dried over sodium sulphate and evaporated under vacuum. In this manner there are obtained the dark red coloured crude bases of high antibacterial activity.

The ethyl acetate extract, which after the described treatment with dilute acetic acid still exhibits a relatively small antibacterial activity, is washed with water, dried over sodium sulphate and evaporated under vacuum. A mobile red oil is obtained; this is treated with petroleum ether whereby a red powder is obtained which consists of cinerubin A, cinerubin B, or a mixture thereof, depending on the nutrient solution used.

*Example 4*

2.95 grams of the crude bases obtained according to Examples 1 and 3 are subjected to a 120-stage counter-current distribution, using the following solvent mixture: 4 parts by volume of carbon tetrachloride, 4.5 parts by volume of methanol and 0.7 part by volume of water. After evaporation of the contents of the individual distribution vessels under vacuum at 30° C., there are found in the stages 7, 51, 63, 88 and 115 small substances and activity maxima, while the greater part of the substances and the greatest activity appear in stage 23. The fractions 14–35 are combined and there are obtained therefrom 1.61 grams of cinerubin A that is paper chromatographically uniform. It is recrystallised from an acetone-methanol mixture and forms plates containing much solvent, which on drying disintegrate to a dark red powder. M.P. 155–157° C. Analysis: C, 61.12%; H, 7.03%; N, 1.91%; $OCH_3$ 4.08. Ultra-violet absorption spectrum in absolute alcohol: Bands at 234 m$\mu$ (log $E$=2.28), 258 m$\mu$ (log $E$=2.36), 292 m$\mu$ (log $E$=1.92), 475 m$\mu$ (log $E$=2.05), 495 m$\mu$ (log $E$=2.11) and 530 m$\mu$ (log $E$=1.94). Infra-red absorption spectrum in liquid paraffin: bands at the following wave lengths among others: 2.9$\mu$, 3.4$\mu$, 3.5$\mu$, 5.77$\mu$, 6.06$\mu$, 6.21$\mu$, 6.81$\mu$, 7.02$\mu$, 7.06$\mu$, 7.21$\mu$, 7.55$\mu$, 7.68$\mu$, 7.88$\mu$, 8.14$\mu$, 8.56$\mu$, 9.88$\mu$, 9.05$\mu$, 9.56$\mu$, 9.84$\mu$, 10.37$\mu$, 10.78$\mu$, 11.19$\mu$, 11.31$\mu$, 11.79$\mu$, 12.32$\mu$, 12.71$\mu$ (band with triple peak), 13.10$\mu$, 13.49$\mu$, 13.75$\mu$ and 14.31$\mu$.

In the circular filter paper chromatogram with the solvent system benzene-formamide, cinerubin A exhibits an R$f$-value of 0.55. Under the same conditions rhodomycin A and B remain at the original drop point.

*Example 5*

A solution of 50 mg. of cinerubin A in 10 cc. of N-sulphuric acid is heated for 20 minutes to 100° C. Red flocks thereby separate. After cooling the red solution is extracted by shaking with ethyl acetate whereby the colour passes over into the organic phase.

The aqueous phase is now neutralised with 2 N-barium hydroxide solution, filtered and evaporated under vacuum. The residue contains at least two reducing sugars, which in a paper chromatogram with a mixture of butanol-glacial acetic acid (9:1) saturate with water give R$f$-values of 0.13 and 0.38 respectively.

The red coloured ethyl acetate extracts are washed with water, dried over sodium sulphate and evaporated under vacuum. The cinerubinone is obtained from a benzene-methanol mixture in bright red crystals: M.P. 217–220° C. Analysis: C, 63.70%; H, 5.38%; (C)$CH_3$, 3.42%; $OCH_3$, 7.27%, active H, 1.26%. Ultraviolet absorption spectrum in absolute alcohol: bands at 234 m$\mu$ (log $E$=3.01), 258 m$\mu$ (log $E$=2.68), 294 m$\mu$ (log $E$=2.25), 470 m$\mu$ (log $E$=2.30), 495 m$\mu$ (log $E$=2.34), 515 m$\mu$ (log $E$=2.28 and 530 m$\mu$ (log $E$=2.20). Infra-red absorption spectrum in potassium bromides: bands (among others) at 2.87$\mu$, 3.00$\mu$, 3.25$\mu$, 3.43$\mu$, 3.52$\mu$, 5.78$\mu$, 6.06$\mu$, 6.24$\mu$, 6.88$\mu$, 7.07$\mu$, 7.55$\mu$, 7.69$\mu$, 8.13$\mu$, 8.30$\mu$, 8.54$\mu$, 8.84$\mu$, 9.06$\mu$, 9.34$\mu$, 9.56$\mu$, 9.75$\mu$, 9.98$\mu$, 10.07$\mu$, 10.28$\mu$, 10.47$\mu$, 11.01$\mu$, 11.59$\mu$, 11.87$\mu$, 12.02$\mu$, 12.72$\mu$, 13.31$\mu$, 13.88$\mu$, 14.10$\mu$, and 14.49$\mu$.

In the paper chromatogram with the solvent system benzene-formamide, cinerubinone shows an R$f$-value of 0.80. With concentrated sulphuric acid it gives a pure blue colouration.

Cinerubinone has activity against influenza virus and can be used as medicament. It is also a valuable intermediate product for the preparation of cinerubin A or B, or analogous substances containing other sugars.

*Example 6*

16 grams of the crude bases obtained according to Example 2 (nutrient solution *d*) or Example 3, are subjected ot a 300-stage counter-current distribution, the following mixture of solvents being used: 7.5 parts by volume of carbon tetrachloride, 6.375 by volume of methanol, and 1.125 parts by volume of water. After evaporation of the contents of the individual distribution vessels under vacuum at 30° C. there are found in addition to small substance and activity maxima, for example in the stages 260–295, cinerubin A in the stages 54–70 and cinerubin B in the vessels 17–37. The solution of these vessels are combined and mixed with 500 cc. of water. The lower phase is then removed and the upper phase extracted twice more with 200 cc. of carbon tetrachloride each time. The extracts are combined, washed with some water, dried with sodium sulfate, and evaporated in vacuo. The residue is dissolved in 50 cc. of benzene, and some methanol is added to the warm solution. On standing, cinerubin B separates in the form of orange-coloured crystals. The substance is recrystallized from the same solvent mixture and then melts at 180–181° C. Analysis: C, 59.76%; H, 6.50%; O, 30.44%; N, 1.78%; $OCH_3$, 4.5%; C—$CH_3$, 6.38%. The U.V. absorption spectrum in pure alcohol shows the following bands:

| $\lambda$ max (m$\mu$) | 235 | 258 | 291 | 297 | 394 | 415 |
|---|---|---|---|---|---|---|
| log $E_{1cm}^{1\%}$ | 2.77 | 2.46 | 2.03 | 2.025 | 1.56 | 1.67 |

| $\lambda$ max (m$\mu$) | 471 | 488 | 497 | 519 | 533 |
|---|---|---|---|---|---|
| log $E_{1cm}^{1\%}$ | 2.17 | 2.24 | 2.27 | 2.16 | 2.10 |

I.R. spectrum (in potassium bromide): Bands inter alia at 2.83$\mu$, 3.38$\mu$, 3.58$\mu$, 5.71$\mu$, 6.16$\mu$, 6.78$\mu$, 7.02$\mu$, 7.47$\mu$, 7.60$\mu$, 8.06$\mu$, 8.48$\mu$, 8.75$\mu$, 9.41$\mu$, 9.72$\mu$, 9.90$\mu$, 10.18$\mu$, 10.62$\mu$, 11.62$\mu$, 12.15$\mu$, 12.43$\mu$, and 12.85$\mu$.

*Example 7*

A solution of 50 mg. of cinerubin B in 10 cc. of 1 N sulfuric acid is heated to 100° C. for 20 minutes and worked up as described in Example 5. The substance obtained from the ethyl acetate extracts is identical with the cinerubinone described in Example 5.

What is claimed is:

1. As a novel product, the antibiotic substance designated as cinerubin A, and obtained by cultivating *cinereoruber* var. *fructofermentans* NRRL 2588 in an aqueous nutrient medium containing an inorganic salt, a nitrogenous compound and a carbohydrate under submerged aerobic conditions until substantial antibacterial activity is imparted to said medium, recovering the antibacterial substances from said medium and isolating cinerubin A by countercurrent distribution, forming crystals of red color, easily soluble in acetone, methyl ethyl ketone, ethyl acetate, amyl acetate, methylene chloride, ethylene chloride, chloroform, carbon tetrachloride, benzene, less soluble in methanol, ethanol, ether and practically insoluble in water and petrol-ether, melting at 155–157° C., forming salts with acids, giving in the elementary analysis the following results:

| | Percent |
|---|---|
| C | 61.12 |
| H | 7.03 |
| N | 1.91 |
| O—CH$_3$ | 4.08 | exhibiting in the U.V.-spectrum in ethanol bands at 234 m$\mu$ (log $E$=2.28), 258 m$\mu$ (log $E$=2.36), 292 m$\mu$ (log $E$=1.92), 475 m$\mu$ (log $E$=2.05), 495 m$\mu$ (log $E$=2.11) and 530 m$\mu$ (log $E$=1.94) and, showing in the I.R.-spectrum in liquid paraffin bands at 2.9$\mu$, 3.4$\mu$, 3.5$\mu$, 5.77$\mu$, 6.06$\mu$, 6.21$\mu$, 6.81$\mu$, 7.02$\mu$, 7.06$\mu$, 7.21$\mu$, 7.55$\mu$, 7.68$\mu$, 7.88$\mu$, 8.14$\mu$, 8.56$\mu$, 9.88$\mu$, 9.05$\mu$, 9.56$\mu$, 9.84$\mu$, 10.37$\mu$, 10.78$\mu$, 11.19$\mu$, 11.31$\mu$, 11.79$\mu$, 12.32$\mu$, 12.71$\mu$ (band with triple peak), 13.10$\mu$, 13.49$\mu$, 13.75$\mu$ and 14.31$\mu$ giving in paper chromatogram with the solvent system formamide-benzene (Zaffaroni) an R$f$-value of 0.85, and yielding on acid hydrolysis the aglycon designated as cinerubinone of melting point 217–220° showing in the U.V.-spectrum bands at 234 m$\mu$ (log $E$=3.01), 258 m$\mu$ (log $E$=2.68), 294 m$\mu$ (log $E$=2.25), 470 m$\mu$ (log $E$=2.30), 495 m$\mu$ (log $E$=2.34) 515 m$\mu$ (log $E$=2.28) and 530 m$\mu$ (log $E$=2.20), and two reducing sugars which in a paper chromatogram with a mixture of butanol-glacial acetic acid (9:1) saturated with water give R$f$-values of 0.13 and 0.38 respectively.

2. As a novel product, the antibiotic substance designated as cinerubin B, and obtained by cultivating *cinereoruber* var. *fructofermentans* NRRL 2588 in an aqueous nutrient medium containing an inorganic salt, a nitrogenous compound and a carbohydrate under submerged aerobic conditions until substantial antibacterial activity is imparted to said medium, recovering the antibacterial substances from said medium and isolating cinerubin B by countercurrent distribution, forming crystals of orange color, easily soluble in acetone, methyl ethyl ketone, ethyl acetate, amyl acetate, methylene chloride, ethylene chloride, chloroform, carbon tetrachloride, benzene, less soluble in methanol, ethanol, ether, and practically insoluble in water and petrol-ether, melting at 180–181° C., forming salts with acids, giving in the elementary analysis the following results: C=59.76%, H=6.50%, O=30.44%, N=1.78%, OCH$_3$=4.54%, C—CH$_3$=6.38%, exhibiting in the U.V.-spectrum in ethanol bands at 235 m$\mu$ $$(\log E^{1\%}_{1\text{ cm.}} = 2.77)$$

258 m$\mu$ (log $E$=2.46), 291 m$\mu$ (log $E$=2.03), 297 m$\mu$ (inflexion), 394 m$\mu$ (inflexion), 415 m$\mu$ (inflexion), 471 m$\mu$ (inflexion), 488 m$\mu$ (log $E$=2.24), 497 m$\mu$ (log $E$=2.27), 519 m$\mu$ (log $E$=2.16) and 533 m$\mu$ (log $E$=2.10) and in the I.R.-spectrum in potassium bromide bands at 2.83$\mu$, 3.38$\mu$, 3.58$\mu$, 5.71$\mu$, 6.16$\mu$, 6.78$\mu$, 7.02$\mu$, 7.47$\mu$, 7.60$\mu$, 8.06$\mu$, 8.48$\mu$, 8.75$\mu$, 9.41$\mu$, 9.72$\mu$, 9.90$\mu$, 10.18$\mu$, 10.62$\mu$, 11.62$\mu$, 12.15$\mu$, 12.43$\mu$ and 12.85$\mu$, giving in paper chromatogram with the solvent system formamide-benzene (Zaffaroni) an R$f$-value of 1.00, and yielding in acid hydrolysis the aglycon designated as cinerubinone of melting point 217–220° showing in the U.V.-spectrum bands at 234 m$\mu$ (log $E$=3.01), 258 m$\mu$ (log $E$=2.68), 294 m$\mu$ (log $E$=2.25), 470 m$\mu$ (log $E$=2.30), 495 m$\mu$ (log $E$=2.34), 515 m$\mu$ (log $E$=2.28) and 530 m$\mu$ (log $E$=2.20).

3. As a novel product the aglycon of a member selected from the group consisting of cinerubin A, the product of claim 1, and cinerubin B, the product of claim 2, respectively, obtained by hydrolyzing a member selected from the group consisting of cinerubin A, cinerubin B and mixtures thereof with a dilute mineral acid and forming red crystals of M.P. 217–220° C., giving in the elementary analysis the following values: C=63.70%, H=5.38%, (C)CH$_3$=3.42%, OCH$_3$=7.27% and active hydrogen=1.26% showing in the U.V.-spectrum in ethanol bands at 234 m$\mu$, (log $E$=3.01), 258 m$\mu$ (log $E$=2.68), 294 m$\mu$ (log $E$=2.25), 470 m$\mu$ (log $E$=2.30), 495 m$\mu$ (log $E$=2.34), 515 m$\mu$ (log $E$=2.28) and 530 m$\mu$ (log $E$=2.20) and in the I.R.-spectrum in potassium bromide bands at 2.87$\mu$, 3.00$\mu$, 3.25$\mu$, 3.43$\mu$, 3.52$\mu$, 5.78$\mu$, 6.06$\mu$, 6.24$\mu$, 6.88$\mu$, 7.07$\mu$, 7.55$\mu$, 7.69$\mu$, 8.13$\mu$, 8.30$\mu$, 8.54$\mu$, 8.84$\mu$, 9.06$\mu$, 9.34$\mu$, 9.56$\mu$, 9.75$\mu$, 9.98$\mu$, 10.07$\mu$, 10.28$\mu$, 10.47$\mu$, 11.01$\mu$, 11.59$\mu$, 11.87$\mu$, 12.02$\mu$, 12.72$\mu$, 13.31$\mu$, 13.88$\mu$, 14.10$\mu$, and 14.49$\mu$ and exhibiting in the paper chromatogram with the solvent system formamide-benzene (Zaffaroni) an R$f$-value of 0.80.

4. The therapeutically useful acid addition salts of the new antibiotic substance of claim 1.

5. The therapeutically useful acid addition salts of the new antibiotic substance of claim 2.

6. The sulfate of the new antibiotic substance of claim 1.

7. The sulfate of the new antibiotic substance of claim 2.

8. The hydrochloride of the new antibiotic substance of claim 1.

9. The hydrochloride of the new antibiotic substance of claim 2.

10. The acetate of the new antibiotic substance of claim 1.

11. The acetate of the new antibiotic substance of claim 2.

12. The pantothenate of the new antibiotic substance of claim 1.

13. The pantothenate of the new antibiotic substance of claim 2.

14. A process for the production of a member of the group consisting of the new antibiotic substances cinerubin A, cinerubin B and mixtures thereof, which comprises cultivating *Streptomyces cinereoruber* var. *fructofermentans* NRRL 2588 in an aqueous nutrient medium containing an inorganic salt, a nitrogenous compound and a carbohydrate under submerged aerobic conditions until substantial antibacterial activity is imparted to said medium, and isolating the antibiotic compounds.

15. A process as set forth in claim 14, wherein the cultivation is carried out for a period of about 36 hours to about 120 hours at a temperature of from about 18° C. to about 40° C.

16. A process for the production of a member of the group consisting of the new antibiotic substances cinerubin A, cinerubin B and mixtures thereof, which comprises cultivating *Streptomyces cinereoruber* var. *fructofermentans* NRRL 2588 in an aqueous nutrient medium containing an inorganic salt, a nitrogenous compound and a carbohydrate under submerged aerobic conditions until substantial antibacterial activity is imparted to said medium, recovering the antibacterial substance therefrom and purifying and crystallizing said substance.

17. A process according to claim 16, wherein the antibacterial substance is extracted from the culture filtrate at a pH between 7 and 9.5 with an organic solvent immiscible with water and selected from the group consisting of lower alkyl esters of lower fatty acids, hydrocarbons, chlorinated hydrocarbons, dilower alkyl ketones, alkanols and dilower alkyl ethers.

18. A process for the production of a new substance wherein a member selected from the group consisting of cinerubin A, the product of claim 1, cinerubin B, the product of claim 2, and mixtures thereof is hydrolyzed with a dilute mineral acid and cinerubinone is recovered.

References Cited in the file of this patent

UNITED STATES PATENTS 2,649,401 Haines _____ Aug. 18, 1953

(Other references on following page)

OTHER REFERENCES

Waksman: The Actinomycetes and Their Antibiotics, pub. 1953, pages 53–54, 76–77, 98–99, 171.

Waksman: "The Actinomycetes," pages 94–97, pub. 1950 by the Chronica Botanica Co., Waltham, Mass.

Corbas et al.: Archiv. Mikro, 1957, vol. 25, pages 325–332.

Pridham et al.: Applied Microbiology, 1958, pages 52–79.

Sneath: J. Gen. Microbiology, August 1957, pages 184–200.